United States Patent
Lam et al.

(10) Patent No.: US 6,237,103 B1
(45) Date of Patent: May 22, 2001

(54) POWER SEQUENCING IN A DATA PROCESSING SYSTEM

(75) Inventors: Noly Y. Lam; Franklin Mark Liu; Lynn Eugene Simmons, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,512

(22) Filed: Sep. 30, 1998

(51) Int. Cl.[7] ........................................................ G06F 1/26
(52) U.S. Cl. ............................ 713/330; 713/300; 713/310
(58) Field of Search .................................. 713/330, 300, 713/310, 320, 340, 321, 323, 324, 322

(56) References Cited

U.S. PATENT DOCUMENTS

| | | | |
|---|---|---|---|
| 4,023,142 | * | 5/1977 | Woesner ............................. 340/172.5 |
| 4,992,970 | * | 2/1991 | Igarashi ................................. 364/900 |
| 5,121,500 | * | 6/1992 | Arlington et al. .................... 395/750 |
| 5,297,261 | * | 3/1994 | Kuranaga ............................. 395/325 |
| 5,414,861 | * | 5/1995 | Horning ............................... 395/750 |
| 5,437,040 | * | 7/1995 | Campbell et al. ................... 395/750 |
| 5,613,130 | * | 3/1997 | Teng et al. ........................... 395/750 |
| 5,958,056 | * | 9/1999 | Lehmann ............................. 713/310 |

\* cited by examiner

Primary Examiner—Robert Beausoleil
Assistant Examiner—Tim T. Vo
(74) Attorney, Agent, or Firm—Leslie A. VanLeeuwen; Felsman, Bradley, Vaden, Gunter & Dillon, LLP

(57) ABSTRACT

A data processing system includes a power control circuit, a processor, a power supply, and a plurality of other components. Upon system reset, the power control circuit can generate at least one sequencing signal indicating a first sequence in which power is to be supplied to the plurality of components. Similarly, power sequencing code executed by the processor upon system reset can selectively generate at least one sequencing signal indicating a second sequence in which power is to be supplied to the plurality of components. The power supply, which can receive both the sequencing signal generated by the power control circuit and the sequencing signal generated by the power sequencing code, supplies power to the plurality of components in the second sequence if the power supply receives the sequencing signal generated by the power sequencing code. In one embodiment, the plurality of components require a plurality of different power supply voltages.

19 Claims, 3 Drawing Sheets

POWER SEQUENCING IN A DATA PROCESSING SYSTEM

BACKGROUND OF THE INVENTION

1. Technical Field

The present invention relates in general to electronic systems and, in particular, to power management in electronic systems. Still more particularly, the present invention relates to power sequencing in an electronic system such as a data processing system.

2. Description of the Related Art

In many electronic systems such as computer systems, the integrated circuit components of the system are mounted on circuit cards. Such circuit cards typically have multiple layers, including one or more interconnect layers that interconnect pins of the various integrated circuits and one or more power and ground planes that supply operating voltages to the integrated circuits. Multiple power planes are often included within a circuit card in order to provide multiple different supply voltages, for example, 1.8 V, 3.3 V, and 5 V, that satisfy the power requirements of the integrated circuits mounted on the circuit card.

In order to power up the integrated circuit components mounted on a multiple-power-plane circuit card in a coherent manner, it is commonly required to sequence the supply of power to the power planes in a particular order. The order in which power is applied to the power planes, which is typically controlled by a power control circuit mounted on the circuit card, may vary between circuit cards, depending on the integrated circuit technologies represented on each circuit card.

A problem arises in that it may be desirable after a circuit card has been installed in an electronic system to modify the default power supply sequencing hardwired into the circuit card's power control circuit. For example, if the circuit card includes a socket for a processor chip, it may be necessary to alter the power sequencing of the circuit card in order to support an upgrade of the processor to one fabricated utilizing a new, faster integrated circuit technology.

As should thus be apparent, it would be useful and desirable to provide a method and system for power sequencing in an electronic system that permit the default power sequencing of a circuit card to be easily modified.

SUMMARY OF THE INVENTION

In accordance with the present invention, a data processing system includes a power control circuit, a processor, a power supply, and a plurality of other components. Upon system reset, the power control circuit can generate at least one sequencing signal indicating a first sequence in which power is to be supplied to the plurality of components. Similarly, power sequencing code executed by the processor upon system reset can selectively generate at least one sequencing signal indicating a second sequence in which power is to be supplied to the plurality of components. The power supply, which can receive both the sequencing signal generated by the power control circuit and the sequencing signal generated by the power sequencing code, supplies power to the plurality of components in the second sequence if the power supply receives the sequencing signal generated by the power sequencing code. In one embodiment, the plurality of components require a plurality of different power supply voltages.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is applicable to any electronic system in which it is desirable to supply power to the various components of the electronic system in a particular sequence. However, with reference now to the figures and in particular with reference to FIG. 1, there is depicted an illustrative embodiment of a multiprocessor data processing system, such as a workstation or server computer, in which the present invention may advantageously be utilized.

Figure 1:
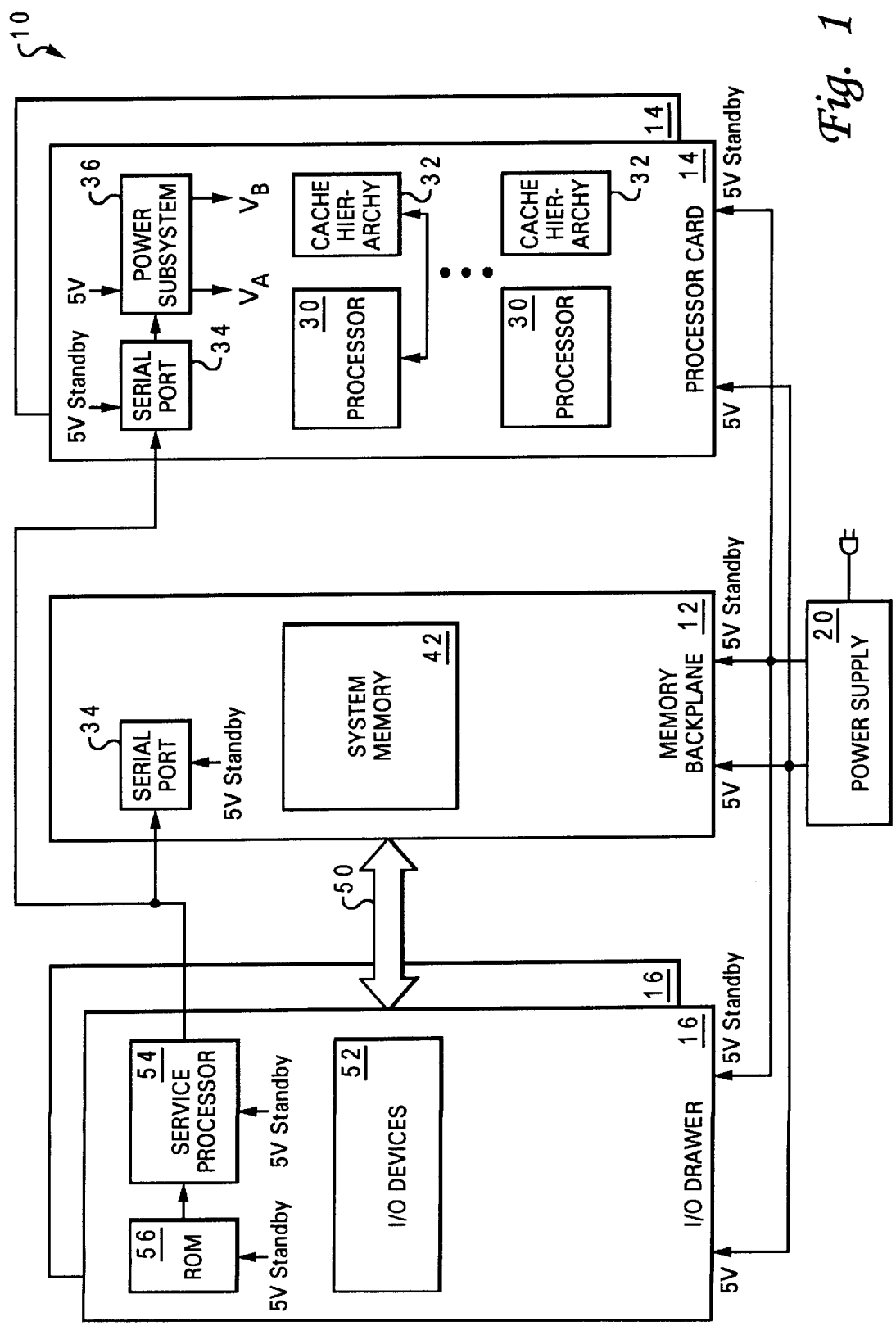
FIG. 1 depicts an illustrative embodiment of a data processing system with which the method and system of the present invention may advantageously be utilized.

As illustrated in FIG. 1, data processing system 10 includes a memory backplane 12 coupled to one or more processor cards 14 and to one or more input/output (I/O) drawers 16. In addition, data processing system 10 includes a power supply 20 that supplies memory backplane 12, processor card(s) 14, and I/O drawer(s) 16 with 5 V power and 5 V standby power inputs. The 5 V standby power input is supplied to memory backplane 12, I/O drawer(s) 16, and processor card(s) 14 as long as power supply 20 has a power input, for example, conventional 110 V AC power. In contrast, the 5 V power input is supplied only when data processing system 10 is powered on.

As depicted, each processor card 14 carries one or more general purpose processors 30, which are each connected to a cache hierarchy 32 that provides the associated processor 30 with low latency storage for instructions and data. Processors 30 are further coupled to system memory 42 mounted on memory backplane 12 by address, control, and data interconnects, which are collectively depicted at reference numeral 40. Each processor card 14 further includes a serial port 34, which is connected to the power subsystem 36 of the processor card 14. As indicated, serial port 34 receives 5 V standby power, and power subsystem 36 receives 5 V power and outputs multiple different supply voltages $V_A$ and $V_B$. These supply voltages are utilized to power processors 30, cache hierarchies 32, and other unillustrated components of a processor card 14.

As illustrated, each I/O drawer 16, which is coupled to memory backplane 12 by one or more I/O buses 50, contains one or more I/O devices 52 that may accessed by processors 30 via memory-mapped I/O. The I/O devices 52 that may be installed in an I/O drawer 16 include small computer system interface (SCSI) adapters, local area network (LAN) adapters, non-volatile storage devices, etc. In addition to such I/O devices 52, at least one I/O drawer 16 includes a service processor 54 coupled to a ROM 56. As discussed further below, service processor 54 performs certain initialization functions at power on (or reset), and may perform additional monitoring functions during operation of data processing system 10. In order to perform such functions, service processor 54 is coupled to a serial port 34 within each of memory backplane 12 and processor card(s) 14.

Figure 2:
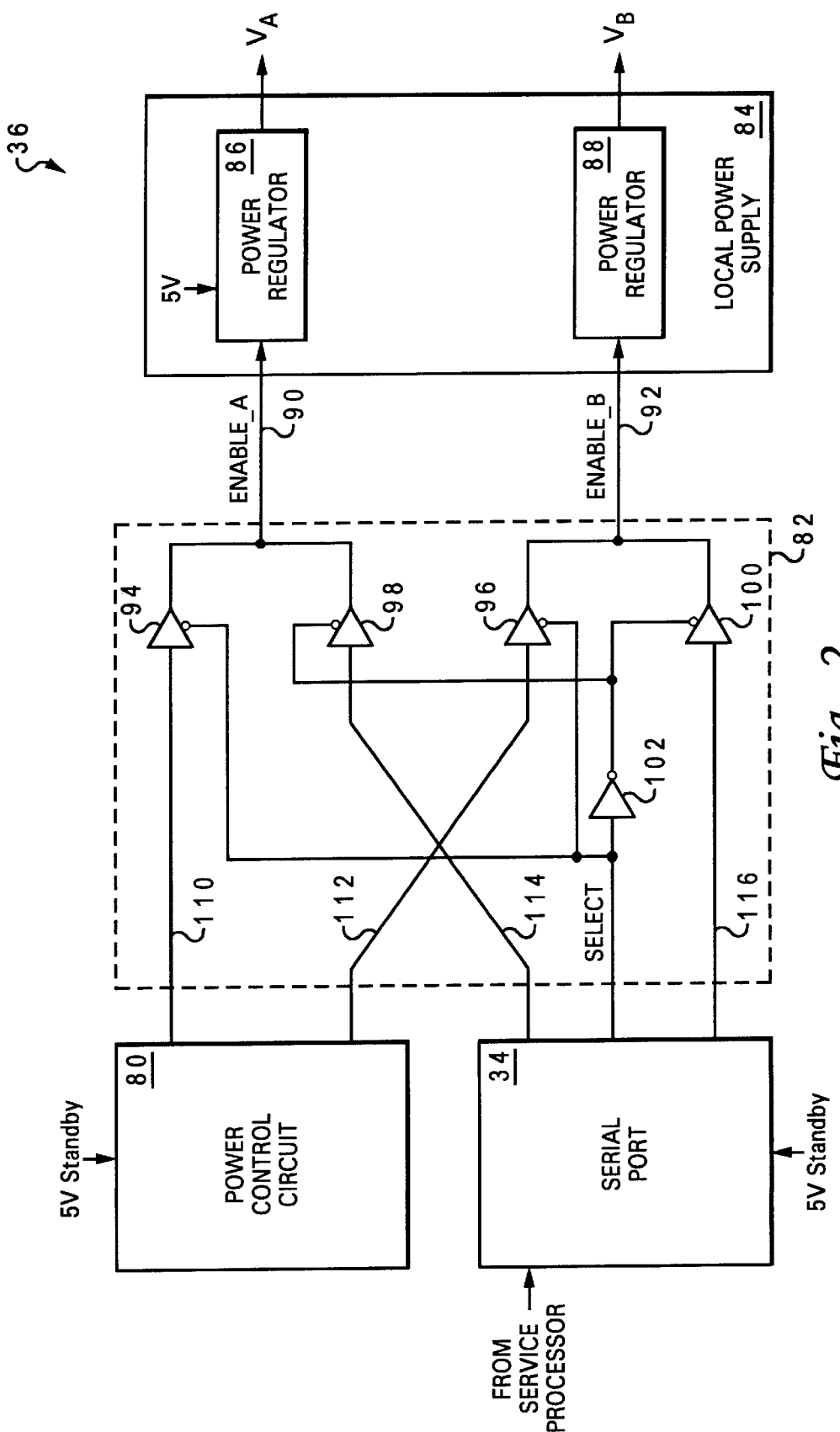
FIG. 2 is a more detailed block diagram of the power subsystem of a processor card in the data processing system illustrated in FIG. 1.

Referring now to FIG. 2, there is depicted a more detailed block diagram of the power subsystem 36 of a processor card 14 in data processing system 10. As illustrated, power subsystem 36 includes a hardware power control circuit 80, selection circuitry 82, and a local power supply 84. Local power supply 84 includes power regulator A 86 and power regulator B 88, which each output a respective one of supply voltages $V_A$ and $V_B$ in response to receipt of both a 5 V power input and a respective one of enable signals 90 and 92. The order in which enable signals 90 and 92 are asserted determines the sequence in which power regulators 86 and 88 initially output supply voltage $V_A$ and $V_B$.

In the depicted embodiment, selection circuitry 82 includes an inverter 102 and four drivers 94–100. Following power on, drivers 94 and 96 receive sequencing signals 110 and 112 as inputs from power control circuit 80, and drivers 98 and 100 receive sequencing signals 114 and 116 as inputs from service processor 54 via serial port 34. The operation of drivers 94 and 96 is controlled by select signal 106, and the operation of drivers 98 and 100 is controlled by the complement of select signal 106 output by inverter 102. Thus, based upon the state of select signal 106, either sequencing signals 110 and 112 or sequencing signals 114 and 116 are chosen by selection circuitry 82 as enable signals 90 and 92.

Figure 3:
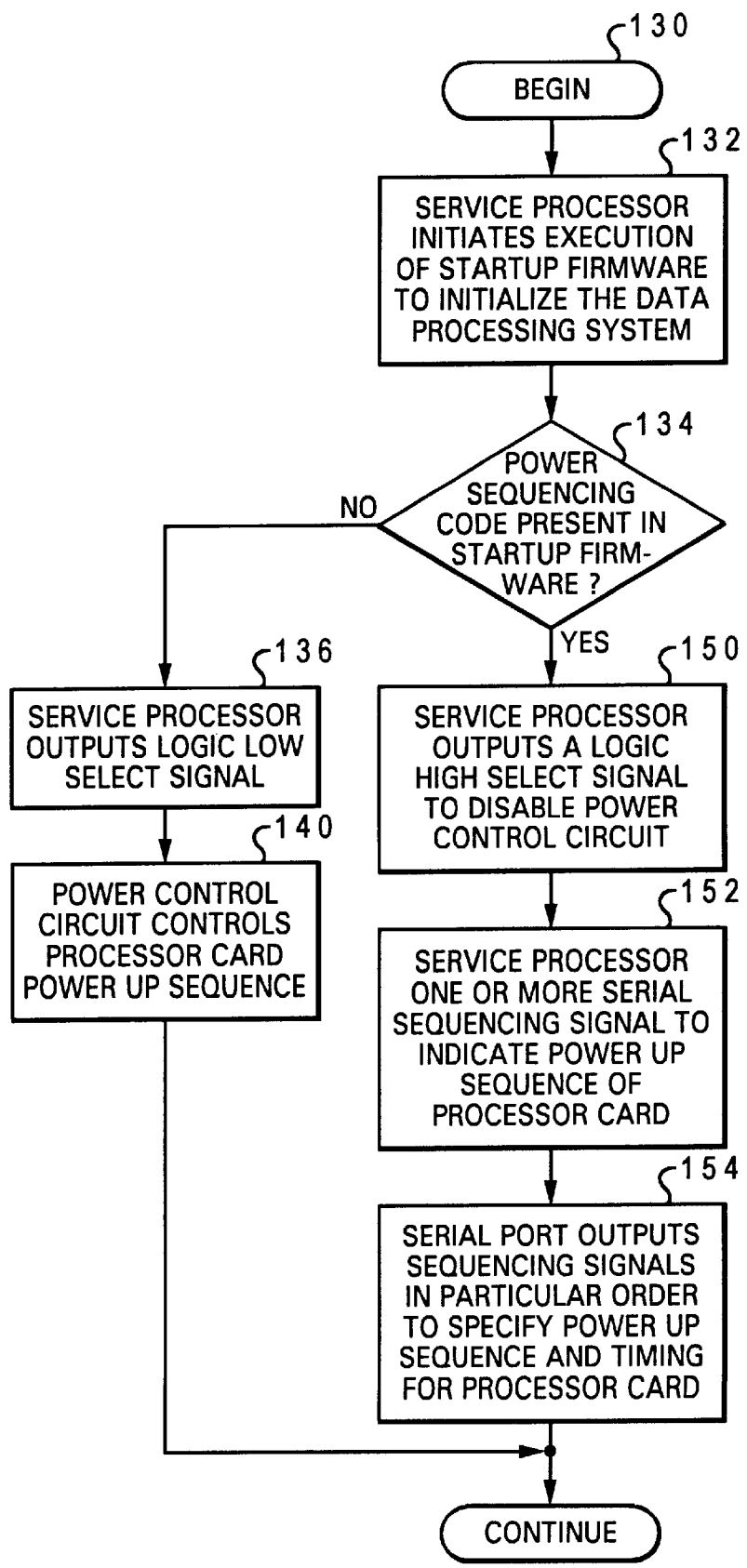
FIG. 3 is a high level logical flowchart of a method for selectively controlling the power up sequence of the components of a processor card in accordance with the present invention.

With reference now to FIG. 3, there is depicted a high level logical flowchart of a method of selectively controlling power sequencing in a data processing system in accordance with the present invention. As illustrated, the process begins at block 130 upon power-on reset (POR) on in response to a user resetting data processing system 10. As shown at block 132, in response system reset, service processor 54 begins executing firmware out of ROM 56 in order to initialize data processing system 10 to a state at which control of the operation of data processing system 10 can be transferred to software (e.g., initialization or operating system software) executed by processors 30. If the firmware executed by service processor 54 does not contain power sequencing code, the process proceeds through block 134 to block 136. Block 136 depicts service processor 54 outputting a logic low select signal to serial port 34 of processor card 14, thereby indicating that the power up sequence for processor card 14 is to follow the predetermined sequence hardwired into power control circuit 80. Thus, as shown at block 140, the timing of sequencing signals 110 and 112 generated by power control circuit 80 determines the sequence in which supply voltages $V_A$ and $V_B$ are output by power regulators 86 and 88. Thereafter, the process passes to block 160, which illustrates service processor 54 continuing the initialization of data processing system 10.

Returning to block 134, if the firmware executed by service processor 54 includes power sequencing code, the process proceeds to block 150, which depicts service processor 54 outputting a logic high select signal, which is received and output by serial port 34 to disable drivers 94 and 96 and enable drivers 98 and 100. Next, as illustrated at block 152, service processor 54 outputs one or more sequencing signals that cause serial port 34 to output sequencing signals 114 and 116 with a particular order and timing. As shown at block 154, sequencing signals 114 and 116 are received by power regulators 86 and 88, which respond by outputting supply voltages $V_A$ and $V_B$ in a software-determined sequence. Thereafter, service processor 54 continues the initialization of data processing system 10 at block 160.

As has been described, the present invention provides an improved method and system for controlling the power up sequence of components in a data processing system According to the present invention, unless software intervention occurs, the power up sequence of components in the data processing system is controlled by a hardware power control circuit. However, if software such as startup firmware intervenes, the power up sequence is controlled by the software rather than the power control circuit. In this manner, the power up sequence of the data processing system can be easily adapted to modifications of the data processing system, such as component upgrades.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to specific "method steps" implementable by a computer system, those skilled in the art will appreciate from the foregoing description that the present invention may also be embodied as a computer program product for use with a computer system. Those skilled in the art should readily appreciate that programs defining the functions of the present invention can be delivered to a computer via a variety of electronic media, which include without limitation: (a) information permanently stored on non-writable storage media (e.g., CD-ROM); (b) information alterably stored on writable storage media (floppy diskettes, hard disk drives, or computer memory); and (c) information conveyed to a computer through a communication medium, such as a computer or telephone network.

What is claimed is:

1. A data processing system, comprising:
    a plurality of components;
    a power control circuit that, upon system reset, can generate at least one sequencing signal indicating a first sequence in which power is to be supplied to said plurality of components;
    memory that stores power sequencing code and a processor, coupled to said memory, that executes said power sequencing code upon system reset, wherein said power sequencing code can selectively generate at least one sequencing signal indicating a second sequence in which power is to be supplied to said plurality of components; and
    a power supply, coupled to receive said at least one sequencing signal generated by said power control circuit and said at least one sequencing signal generated by said power sequencing code, wherein said power supply supplies power to said plurality of components in said second sequence upon system reset in response to receipt of said at least one sequencing signal generated by said power sequencing code.

2. The data processing system of claim 1, wherein said plurality of components require a plurality of different power supply voltages.

3. The data processing system of claim 1, and further comprising a memory that stores said power sequencing code.

4. The data processing system of claim 1, wherein said plurality of components, power control circuit, and power supply reside on a single circuit card.

5. The data processing system of claim 1, and further comprising selection circuitry interposed between said power control circuit and said power supply and between said processor and said power supply, wherein said selection circuitry receives as inputs said at least one sequencing signal generated by said power control circuit and said at least one sequencing signal generated by said power sequencing code and outputs to said power supply only said at least one sequencing signal generated by said power control circuit or only said at least one sequencing signal generated by said power sequencing code.

6. The data processing system of claim 1, wherein at least one of said first sequence and said second sequence supplies power to selected ones of said plurality of components at different times.

7. The data processing system of claim 5, wherein said selection circuitry receives a select signal generated in response to said power sequencing code, wherein said selection circuitry selects between said at least one sequencing signal generated by said power control circuit and said at least one sequencing signal generated by said power sequencing code in response to said select signal.

8. A method for power sequencing in a data processing system having a plurality of components, said method comprising:

in response to reset of a data processing system, executing startup firmware;

in response to executing power sequencing code within said startup firmware, outputting one or more signals; and in response to said signals, preventing a hardware power up sequence from being performed and supplying power to said plurality of components in a sequence determined by said power sequencing code.

9. The method of claim 8, wherein supplying power to said plurality of components in a sequence determined by said power sequencing code comprises supplying a plurality of different power supply voltages to said plurality of components in a sequence determined by said power sequencing code.

10. The method of claim 8, and further comprising storing said power sequencing code within a memory in said data processing system prior to power on.

11. The method of claim 8, wherein said plurality of components reside on a single circuit card, said method further comprising transmitting said signals from a remote service processor to said circuit card.

12. The method of claim 8, wherein said data processing system includes a power control circuit that outputs one or more sequencing signals, said method further comprising:

in response to execution of said power sequencing code, selecting either said sequencing signals or said one or more signals output in response to said power sequencing code as inputs to a power supply.

13. The method of claim 8, wherein said sequence determined by said power sequencing code supplies power to selected ones of said plurality of components at different times.

14. A program product for use by a data processing system including a plurality of components, said program product comprising:

a computer-readable medium; and power sequencing code within said computer-readable medium, wherein when executed by the data processing system, said power sequencing code causes the data processing system to prevent a hardware power up sequence from being performed and to supply power to the plurality of components in a sequence determined by said power sequencing code.

15. The program product of claim 14, wherein said computer-readable medium is a non-volatile memory and said power sequencing code forms a portion of startup firmware of the data processing system.

16. The program product of claim 14, wherein said power sequencing code causes the data processing system to supply a plurality of different power supply voltages to the plurality of components in a sequence determined by said power sequencing code.

17. The program product of claim 14, said power sequencing code further comprising instructions, within said computer readable medium, that cause the data processing system to transmit one or more signals from a service processor to a circuit card on which said plurality of components are mounted.

18. The program product of claim 14, wherein the data processing system includes a power control circuit that outputs one or more sequencing signals, said program product further comprising instructions, within said computer readable medium, that cause the data processing system to generate a signal selecting or deselecting said sequencing signals.

19. The program product of claim 14, wherein said sequence determined by said power sequencing code supplies power to selected ones of said plurality of components at different times.

* * * * *